US012807419B2

(12) United States Patent
Dingnis et al.

(10) Patent No.: US 12,807,419 B2
(45) Date of Patent: Nov. 24, 2026

(54) SPIRAL CONVEYOR AND DRUM DRIVE FOR SPIRAL CONVEYOR

(71) Applicant: Habasit AG, Reinach (CH)

(72) Inventors: Thomas Dingnis, Jettingen (FR); Dietmar Elsner, Lörrach (DE); Gergely Janos, Schopfheim (DE)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 17/503,251

(22) Filed: Oct. 15, 2021

(65) Prior Publication Data

US 2023/0124209 A1 Apr. 20, 2023

(51) Int. Cl.
*B65G 33/24* (2006.01)

(52) U.S. Cl.
CPC .................................... *B65G 33/24* (2013.01)

(58) Field of Classification Search
None
See application file for complete search history.

(56) References Cited

U.S. PATENT DOCUMENTS

| | | | | | |
|---|---|---|---|---|---|
| 5,139,135 | A * | 8/1992 | Irwin | B65G 17/086 | 198/852 |
| 5,375,695 | A * | 12/1994 | Daringer | B65G 21/18 | 198/848 |
| 6,062,375 | A * | 5/2000 | Pupp | B65G 21/18 | 198/778 |
| 8,926,463 | B1 * | 1/2015 | Eldor | B65G 21/18 | 474/148 |
| 9,394,109 | B2 * | 7/2016 | Talsma | B65G 15/60 | |
| 10,947,048 | B2 * | 3/2021 | Elsner | B65G 21/18 | |
| 11,014,751 | B2 * | 5/2021 | Perdue | B65G 17/064 | |
| 11,053,081 | B2 * | 7/2021 | Perdue | B65G 23/06 | |

* cited by examiner

*Primary Examiner* — Kavel Singh
(74) *Attorney, Agent, or Firm* — Hodgson Russ LLP

(57) ABSTRACT

A spiral conveyor has a drum extending from a bottom to a top and having a transition height. The drum includes a plurality of drive bars, each having a drive side parallel to an axis of rotation of the drum. The drive side extends in length from the transition height to the top or the bottom of the drum (depending on configuration). The drive bars are spaced apart around a circumference of the drum. The drum includes a plurality of transition members, each having a drive surface. At least a portion of each drive surface is at an angle to the axis of rotation of the drum such that over an infeed distance, the circumferential location of the drive surface of each transition member is advanced by a collapsing distance of a corresponding modular belt. The spiral conveyor further includes a helical support around a circumference of the drum.

21 Claims, 10 Drawing Sheets

SPIRAL CONVEYOR AND DRUM DRIVE FOR SPIRAL CONVEYOR

FIELD OF THE DISCLOSURE

The present disclosure relates to a direct drive drum for spiral conveyor systems.

BACKGROUND OF THE DISCLOSURE

Conveyor belts traveling a helical path (so-called "spiral conveyors") are often used to convey articles through climate-controlled environments over an extended period of time. For example, spiral conveyors are used to convey food items through freezers, proofers, etc.

Some previous spiral conveyors have been driven at locations of the belt path outside the spiral, requiring a very high belt tension near the drive location(s) in order to pull the belt through the spiral. To reduce the belt tension, other spiral conveyors have been driven using an overdrive configuration where a conveyor belt follows a helical path around a central drum, and the central drum drives the belt by friction with the inside edge of the belt. The central drum is driven at a speed which is greater than the speed of the belt (i.e., the belt is allowed to slip). In this way, the belt is driven along the entire helical path around the central drum thereby eliminating the need for a high maximum belt tension at a drive location. However, overdrive systems for spiral conveyors may create considerable wear on the driven edge of the conveyor belt and the outer surfaces of the drum due to the constant slipping of the belt on the drum. Furthermore, in addition to the frictional drum, a second drive must be used to define the belt speed.

Additionally, it is difficult to predict the coefficient of friction between the drum and the belt because the coefficient depends on factors such as belt material, cage bar material, temperature, humidity, surface roughness, surface shape, contact pressure, speed, etc. Another impact to the coefficient of friction results from the articles being conveyed. For example, when conveying foodstuffs like marinated meat, fat and other drippings may come into contact with the drum, in which case the coefficient of friction between the drum and the belt will decrease significantly. In a more particular example, the coefficient of friction between a steel drum and a belt made from polypropylene is approximately 0.3, whereas if a substance like fat from conveyed meat is introduced between the drum and the belt, the coefficient may drop to 0.1 or less. The driving force imparted on the belt by the drum will drop commensurate to the change in coefficient of friction. Ultimately, such a change in driving force will likely interrupt production due to belt lift up, belt breakage, or both.

On the other hand, the friction between the belt and its support can change over time. Here, there is a very high probability that debris from products transported on the belt will contaminate the support. In most cases, friction between the belt and the support increases over time. At some point, the friction between belt and drum used to drive the belt may no longer be sufficient to overcome the friction between the belt and the support. The may cause a production stoppage.

Other spiral conveyor systems use positive drives, wherein the rotating drum includes drive bars around its periphery to directly engage structures on the inside edge of the driven conveyor belt. Such positive drive system do not rely on slippage and friction between the drum and the belt, and therefore, do not suffer from the disadvantages of overdrive system. However, positive drive systems are problematic where the conveyor belt comes into contact with the drum (the "infeed"). At the infeed, as the inside edge of the belt collapses into the turn radius of the drum, there is a momentary difference between the pitch of the drive bars on the drum and the pitch of the structures on the insider edge of the belt. This difference in pitch can cause chatter, surges in belt tension, and other issues with the conveyor belt which can result in belt breakage.

From US 2017/0022012 A1 and the related patent application publications US 2018/0290833 A1 and US 2019/0308817 A1 positive drive systems, also known as direct drive systems, for spiral conveyor belts are known, in which drive elements—in particular in the form of contoured ribs and cage bars forming part of a drive drum—engage and drive the modular conveyor belt, but also support the same. The drive drum can also include a continuous, circumferential ring that extends between the terminus of the ribs and the entrance end of the drum, thereby connecting the drive elements and providing a belt support surface.

WO 2013/142136 A1 discloses similar positive drive systems, in which combined drive and support elements engage, drive and support the modular conveyor belt. Additional support elements may be arranged between these combined drive and support elements.

A technical problem encountered with such known positive or direct drive systems when used to drive a modular conveyor belt (in this context "modular" means made up of a plurality of individual belt modules) is the creation of unwanted tension in the modular conveyor belt as they do not allow for sufficient slippage between the drive drum and the conveyor belt. Such tension particularly occurs during a change of direction of movement or belt travel for the modular conveyor belt.

When the direct drive drum forces the conveyor belt from a linear into a circular direction of belt travel, namely circumferentially around the direct drive drum such as in a spiral conveyor system, the individual belt modules of the modular conveyor belt are forced to move closer together towards their (inner) ends which are proximate to and supported by the direct drive drum and to move apart towards their (outer) ends which are distant to the direct drive drum. Thus, during this "collapse phase" the distance between individual belt modules of the conveyor belt needs to change, while the distance between individual drive elements of the drive drum (the drive elements engaging the conveyor belt at or between its individual belt modules) remains constant. The individual belt modules are forced together and apart at the same time, hence generating movement within the modular conveyor belt and between the modular conveyor belt and the direct drive drum. In addition, with some direct drive solutions, there is a risk that drive elements located on the conveyor belt do not properly mate with corresponding drive elements located on the drum. This creates unexpected forces which can damage the belt, the drive bar, or both. Over time, such damage can lead to failure of the whole spiral system.

When the modular conveyor belt, on leaving the direct drive drum in a disengagement phase, changes from a circular to a linear direction of belt travel, the individual belt modules need to re-align and come off the outer surface, in particular the drive elements of the direct drive drum, which generates tension as well. Sometimes the tension at the exit also is too low and should be increased slightly.

Accordingly, there is a long-felt need for a positive drive spiral conveyor having an infeed to cleanly engage a belt.

BRIEF SUMMARY OF THE DISCLOSURE

In a first aspect, it is an object of embodiments of the present disclosure to provide a direct drive drum for better control of the tension generated within the modular conveyor belt, and in particular, to allow more engagement tolerance during a collapse phase of the modular conveyor belt.

In some embodiments, the present disclosure may be embodied as a spiral conveyor having a rotating cylindrical drum. The drum extends from a bottom to a top. The drum has a transition height where a modular belt is fully engaged by the drum. The drum includes a plurality of drive bars. Each drive bar has a drive side parallel to an axis of rotation of the drum. The drive side extends in length from the transition height to the top of the drum for an upgoing conveyor, or from the transition height to the bottom of the drum for a downgoing conveyor. The drive bars are spaced apart around a circumference of the drum.

The drum includes a plurality of transition members. Each transition member has a drive surface. At least a portion of the drive surface of each transition member is at an angle to the axis of rotation of the drum such that over an infeed distance, the circumferential location of the drive surface of each transition member is advanced by a collapsing distance of a corresponding modular belt. At the transition height of the drum, the circumferential location of each drive surface transition member is aligned with a corresponding circumferential location of a drive side of a corresponding drive bar.

The spiral conveyor further includes a helical support around a circumference of the drum. A helix angle of the helical support is selected such that the helical support extends ¼ to 2 of the circumference of the drum over the infeed distance.

In some embodiments, the spiral conveyor includes a plurality of parallel support bars. At least one support bar is disposed between each adjacent pair of drive bars around the circumference of the drum. Each support bar extends upwards in an upgoing conveyor and downwards in a downgoing conveyor from at least the transition height. In some embodiments, each support bar extends from the corresponding transition member to an outfeed height of the drum. In some embodiments, the outfeed height is lower than the top of the drum in an upgoing conveyor, or higher than the bottom of the drum in a downgoing conveyor. In some embodiments, an inside edge of a modular belt is in contact with the drive bars and the support bars between the transition height and the outfeed height.

In some embodiments, the spiral conveyor further includes a modular belt driven on a helical path around the drum by the plurality of drive bars engaging with a plurality of teeth on an inside edge of the modular belt. In some embodiments, each tooth of the plurality of teeth has a drive face configured to contact a drive side of a drive bar. The drive face may be disposed at an angle of between 1° and 5°, inclusive, with respect to a radial of the drum. In some embodiments, the modular belt moves radially inward on the drum and the distance between adjacent teeth decreases over the infeed distance.

In some embodiments, the present disclosure may be embodied as a spiral conveyor having a drum. The drum has an outer periphery extending from a bottom to a top. The drum has a transition height proximate the bottom for an upgoing spiral or proximate the top for a downgoing spiral. The drum has a plurality of parallel drive bars. Each drive bar has a drive side extending in length on the periphery of the drum between the transition height and the top of the drum for an upgoing spiral and between the transition height and the bottom of the drum for a downward spiral.

The drum also has a plurality of transition members. Each transition member has a drive surface having a length on the periphery of the drum. Each drive surface is circumferentially aligned with a corresponding drive side of a drive bar at the transition height. At least a portion of each drive surface is at an angle to a rotational axis of the drum such that over an infeed distance, the circumferential location of the drive surface is advanced by at least a collapsing distance of a modular belt.

The spiral conveyor includes a modular belt configured to advance up in an upgoing conveyor, or down in a downgoing conveyor, in a conveying direction along a helical conveying path around the periphery of the drum. The modular belt has a plurality of teeth spaced apart along a length of the modular belt on an inside edge. Each tooth of the plurality of teeth is configured to engage a transition member and a drive member bar of the drum. In some embodiments, each tooth of the plurality of teeth has a drive face configured to contact a drive bar. In some embodiments, the drive face is disposed at an angle of between 1° and 5°, inclusive, with respect to a radial of the drum.

In some embodiments, the modular belt moves radially inward on the drum and the distance between adjacent teeth decreases over the infeed distance.

In some embodiments, the spiral conveyor includes a helical support around the periphery of the drum. A helix angle of the helical support is such that the helical support extends ¼ to 2 of times the circumference of the drum over the infeed distance.

In some embodiments, the spiral conveyor further includes a plurality of parallel support bars. Each support bar is disposed between two drive bars around the periphery of the drum and extends upwards from a corresponding transition member in an upgoing conveyor and downwards from a corresponding transition member in a downgoing conveyor. In some embodiments, each support bar extends from the corresponding transition member to an outfeed height of the drum. In some embodiments, an inside edge of the modular belt is in contact with the drive bars and the support bars between the transition height and the outfeed height.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1A:
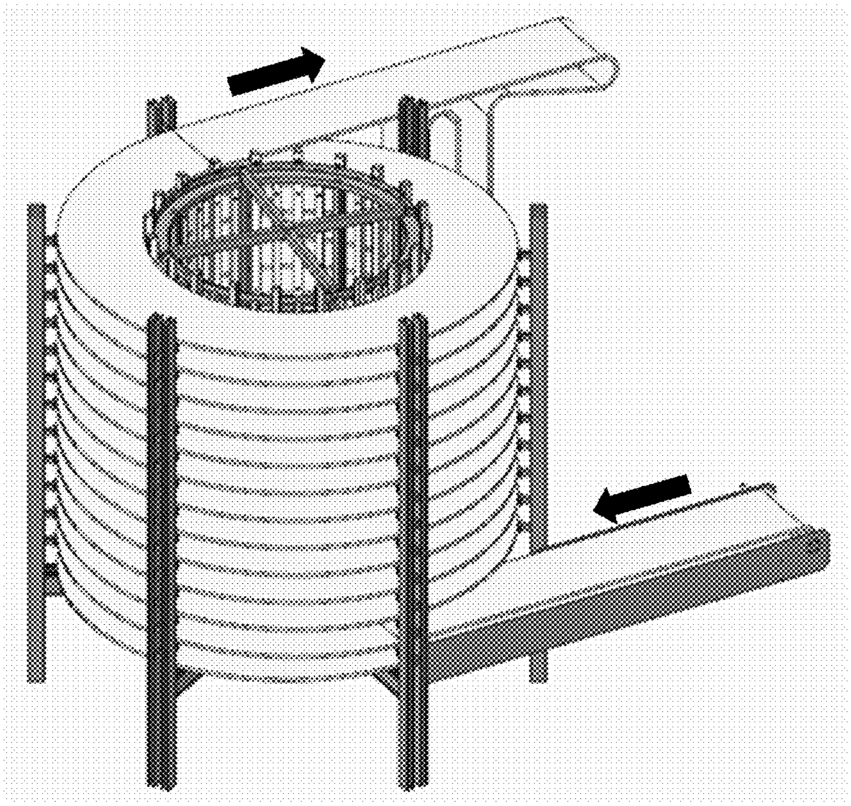
FIG. 1A is a perspective view of a spiral conveyor system, configured as an upgoing conveyor.
Figure 1B:
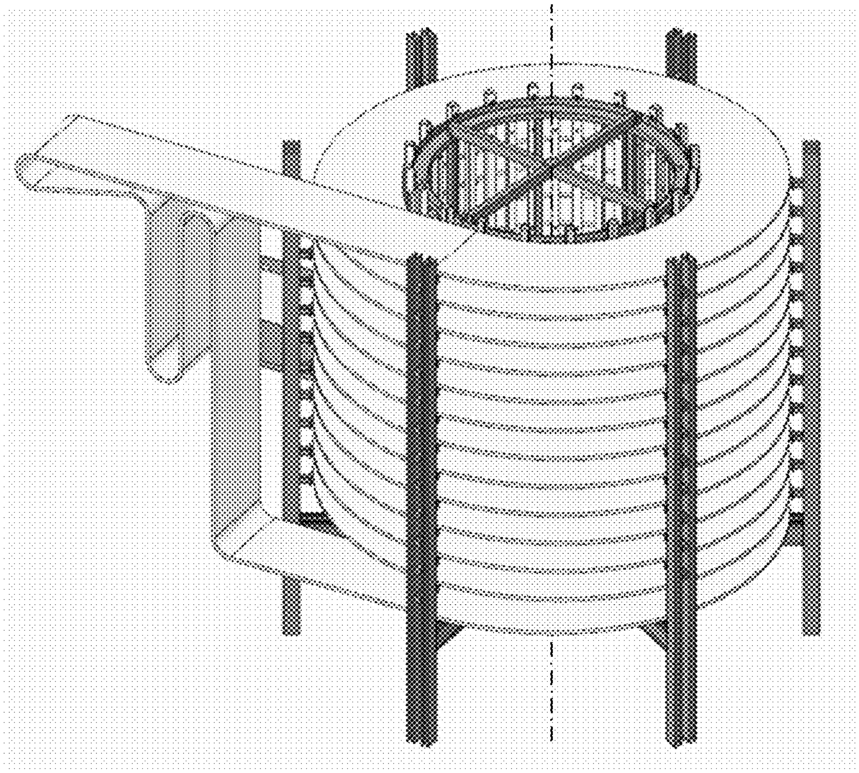
FIG. 1B is a perspective view of the spiral conveyor system of FIG. 1B.
Figure 2:
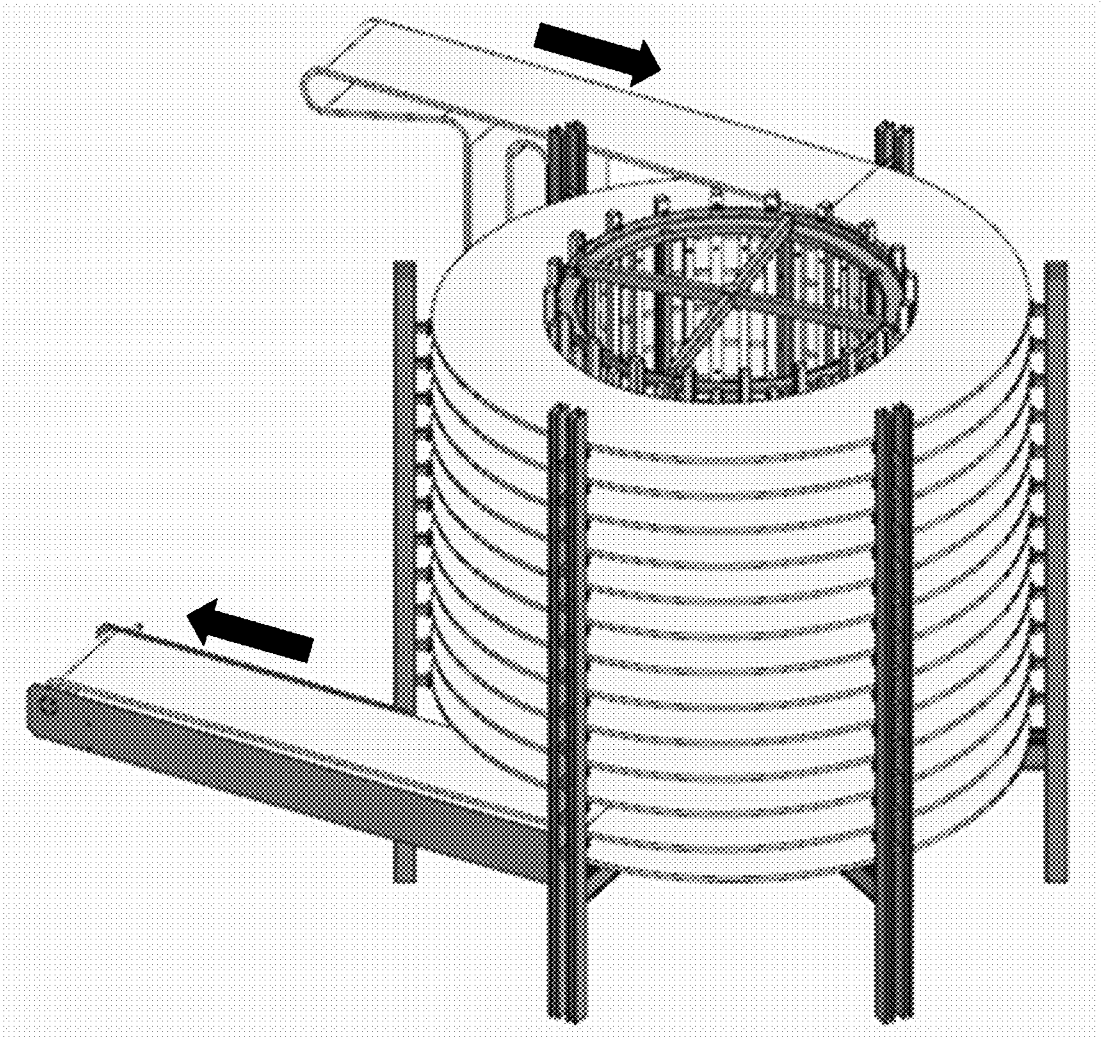
FIG. 2 is a perspective view of another spiral conveyor, configured as a downgoing spiral.
Figure 3A:
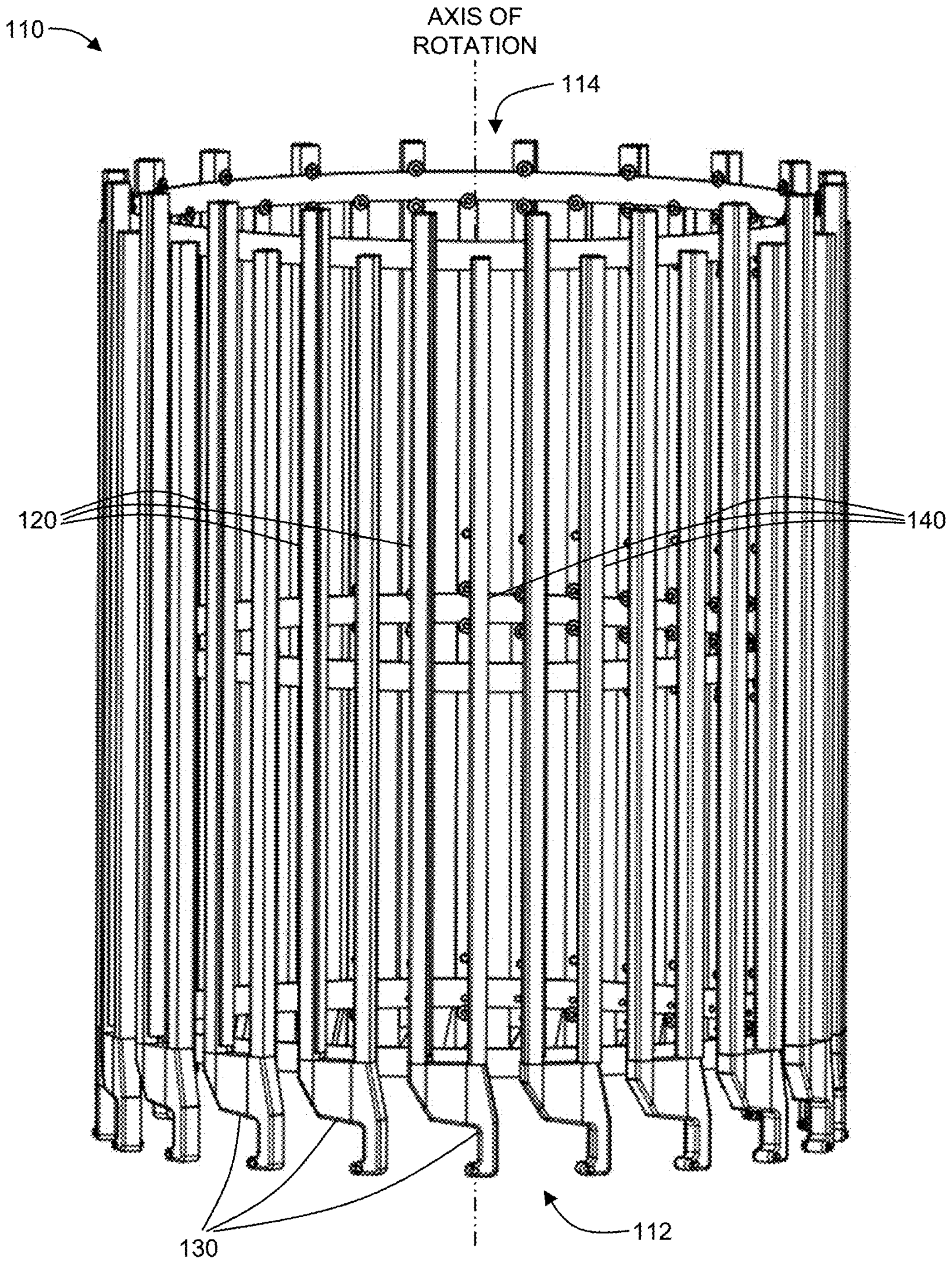
FIG. 3A is a drum according to an embodiment of the present disclosure.

In a first aspect, the present disclosure may be embodied as a spiral conveyor 100 having a rotating cylindrical drum 110 (see, e.g., FIG. 3A). The drum 110 is rotatable about a vertical axis of rotation and extends from a bottom 112 to a top 114. The drum may rotate in a clockwise direction or a counter-clockwise direction (as viewed from above the drum). The drum may be configured to drive a conveyor belt along a helical (i.e., spiral) path such that the belt travels upward such as the configuration shown in FIGS. 1A and 1B—an "upgoing" conveyor—or to drive a conveyor belt downward such as the configuration shown in FIG. 2—a "downgoing" conveyor. An upgoing conveyor may be arranged to have a clockwise or a counter-clockwise rotation. Similarly, a downgoing conveyor may be arranged to have a clockwise or a counter-clockwise rotation. For clarity and convenience, embodiments of present disclosure will be described with reference to a clockwise, upgoing conveyor unless otherwise noted. This is not intended to be limiting, and the described concepts may be used for conveyor systems having counter-clockwise and/or downgoing configurations.

The rotation axis is a geometric, imaginary rotation axis which is the geometric middle axis extending through the center of each of the (imaginary) top and bottom circular areas of the drum and over the entire height of the drum. For instance, the rotation axis (or axis of rotation) may not be a mechanical part or element in case the drum is mounted on and supported by and/or driven by a turntable (e.g., featuring a circumferential gear rim), drive disk, or cog wheel. However, the drum may have a rotation axis in the form of a mechanical part which is used to support and/or drive the drum, e.g., with one or more bearings, sprockets and/or cog wheels attached to one or both ends of the rotation axis.

Figure 3B:
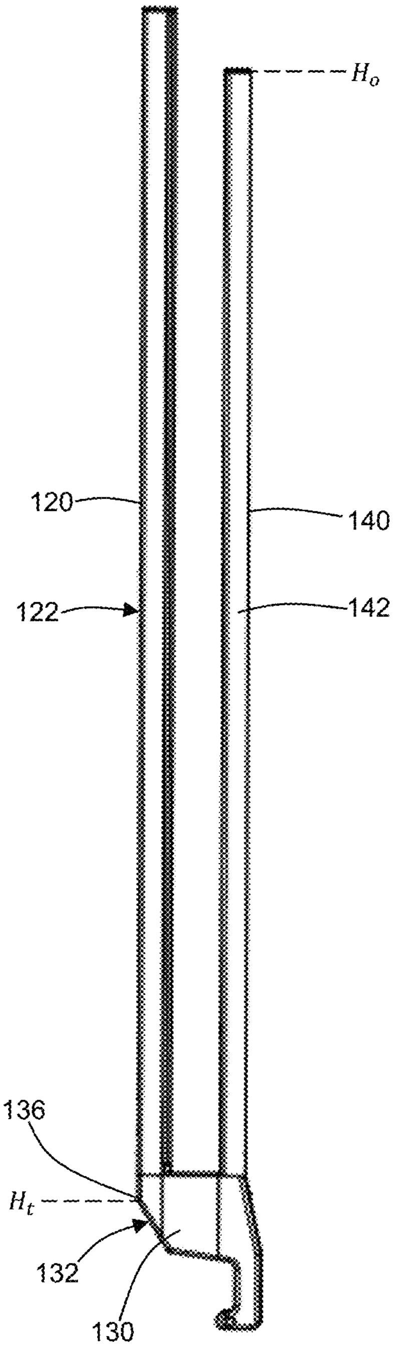
FIG. 3B is a view of a drive bar, support bar, and transition member of the drum of FIG. 3A, shown in isolation from the drum.
Figure 6A:
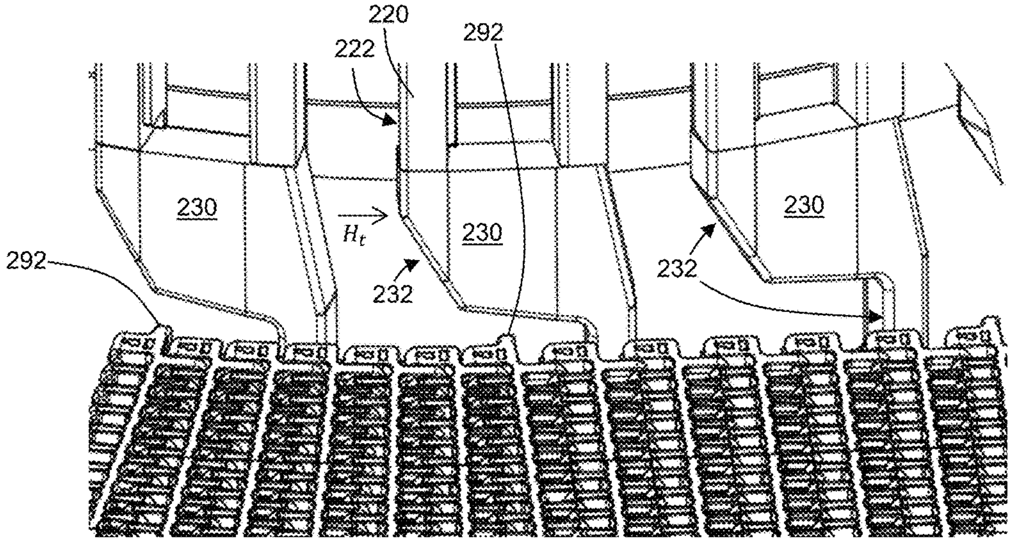
FIG. 6A is another detail view showing a portion of the conveyor at an infeed section of the drum.

With reference to FIGS. 3B and 6A, the drum has a transition height, $H_t$, above which the conveyor belt is fully engaged by the drum for an upgoing conveyor (and below which the belt is fully engaged for a downgoing spiral). Below the transition height, a belt of an upgoing spiral conveyor transitions from a linear configuration when approaching the drum, to partial-engagement as the belt first meets the drum and begins to collapse, and ultimately to full engagement where the belt is fully collapsed at the transition height.

A plurality of drive bars 120 make up an external cylindrical circumference of the drum 110. Each drive bar 120 of the plurality of drive bars has a drive side 122 which is parallel to the axis of rotation (shown in FIG. 1B). The drive bars 120 are arranged to form a cylinder. Each drive bar is spaced apart from the adjacent drive bars around the circumference of the drum 110. The drive sides of the plurality of drive bars has a length which extends from the transition height, $H_t$, to the top of the drum (for an upgoing spiral) or from the transition height to the bottom of the drum (for a downgoing spiral).

The drum may engage a modular conveyor belt by drive bars engaging with teeth of the modular belt. The teeth of the modular belt may extend inwardly (in a radial direction) from the edge of the belt. The drum engages the conveyor belt by the drive side of each drive bar engaging a tooth of the belt—e.g., by pushing against the tooth. The modular belt is made up of individual belt modules, where adjacent belt modules are connected to each other. In a radius or spiral (modular) conveyor belt the interconnection of the belt modules is such that the belt modules can turn relative to each other at least to some degree to the direction of belt travel. For example, adjacent belt modules can be connected by intercalating link ends, whereby the intercalating link ends are linked by a pivot rod extending through slots in the link ends, the slots allowing the pivot rod to move to some extent in the direction of belt travel and in the opposite direction thereby forming a somewhat flexible connection, i.e., allowing the belt modules to move relative to each other.

In some embodiments, a spiral conveyor does not include the corresponding modular belt. In other embodiments (such as, for example, the embodiment of FIG. 4), a spiral conveyor includes a modular belt having a plurality of teeth configured to engage the drive bars (i.e., the drive surfaces of the drive bars). With reference to FIGS. 5 and 6A. The drum 210 and the corresponding modular belt 290 are configured such that the teeth 292 of the belt are spaced apart from each other by two or more belt modules—i.e., spaced apart by Z, such that, for example, when Z=4, every fourth module has a tooth. For example, the spacing may be such that a belt is configured with a tooth every third module, every twelfth module, or an integer value therebetween (i.e., $3 \le Z \le 12$). In some embodiments, Z is selected to be a value from 2 to 20 modules, inclusive ($2 \le Z \le 20$). In an example, if Z=2, then the conveyor belt includes a tooth every second module—i.e., each module with a tooth is separated from adjacent module with a tooth by a module that does not have a tooth. In some embodiments, the teeth are spaced apart by between 5 and 15 belt modules.

Conveyor belts having a separation between toothed modules (i.e., where Z>2) advantageously allow the belt to be made from modules having the same pitch or differing pitches. For example, the belt modules may be selected to provide a tooth spacing which is tailored for a given drive bar spacing. Among many advantages, this allows for a conveyor belt to be configured to retrofit an existing drum configuration. For example, the radius of an existing drum and the number of drive bars may be known. Based on this information (and optionally other considerations, such as, for example, helix slope described below, belt width, etc.), the conveyor belt module configuration, including tooth spacing, may be selected. The conveyor belt may be configured using belt modules of the same or differing pitch so as to match or closely match the designed drive bar spacing. In an illustrative example, for a given drum having a configuration with 57 drive bars, the appropriate configuration of belt modules may have a tooth every $7^{th}$ module, with 6 of the modules having a collapsed pitch of 30.9 mm and 1 of the modules having a collapsed pitch of 35 mm. Alternatively, where the same drum is configured with 30 drive bars and a belt configured with a tooth every $12^{th}$ module, with 2 of the modules having a collapsed pitch of 30.9 mm pitch, 8 of the modules having a collapsed pitch of 35 mm pitch, and 2 of the modules having a collapsed pitch of 38.5 mm. It should be noted that these values are meant solely to illustrate the concept of tooth spacing using various belt modules and rounded values. In this way, where each tooth of a modular belt is spaced apart by two or more belt modules (i.e., Z>2), at least one module of the two or more belt modules may have a pitch that is different from the pitch of at least one other belt module of the two or more belt modules.

The ability to design a conveyor belt with custom tooth spacing for use with existing drums is advantageous because it allows a problematic friction-based spiral system to be retrofitted as a direct drive system using the existing drum. This can dramatically reduce the cost and time required to convert the system.

Figure 6B:
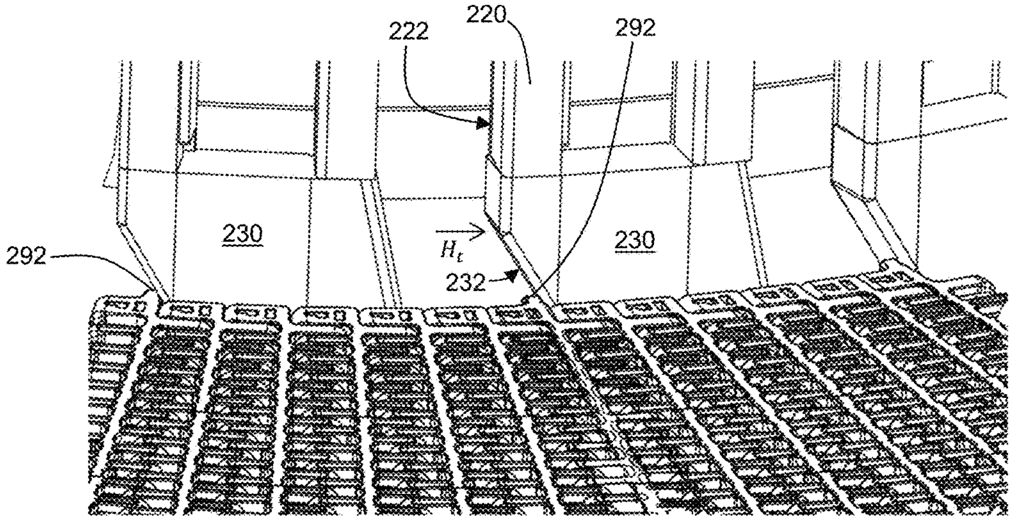
FIG. 6B is another detail view showing the conveyor at the infeed section which is higher than the conveyor of FIG. 6A.
Figure 6C:
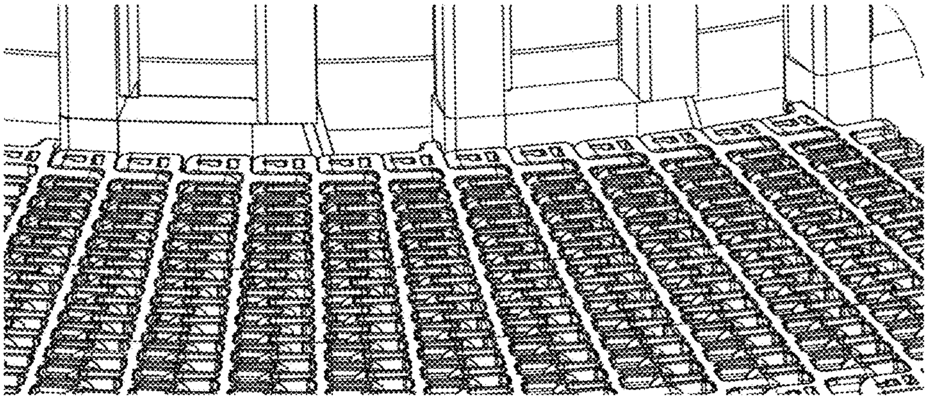
FIG. 6C is another detail view showing the conveyor at the fully engaged by the drum, at a height above the transition height.
Figure 9A:
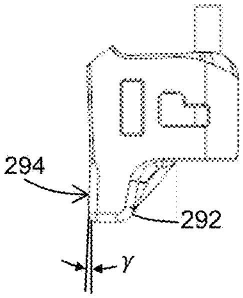
FIG. 9A is a top view of a tooth of a belt module and showing an angle of the drive face.
Figure 9B:
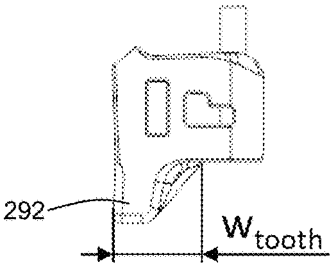
FIG. 9B is a top view of the tooth of FIG. 9A and showing the tooth width.

Each tooth 292 of the plurality of teeth may have a drive face 294 which is configured to contact the drive side 222 of a drive bar 220 (see, e.g., FIGS. 6A-6C). In some embodiments, the drive face 294 is disposed at an angle, γ, with respect to a radial direction of the drum. In some embodiments, γ is selected to be between 2° and 5°, inclusive (see, e.g., FIG. 9A). In some embodiments, γ is selected to be between 0° and 15°, inclusive.

The drive bars of the drum are configured to directly engage with elements of a modular conveyor belt to advance the conveyor belt by the drive bars pushing on the modular belt elements, thereby providing a positive drive (e.g., substantially without slip) rather than a friction drive (overdrive).

Figure 3C:
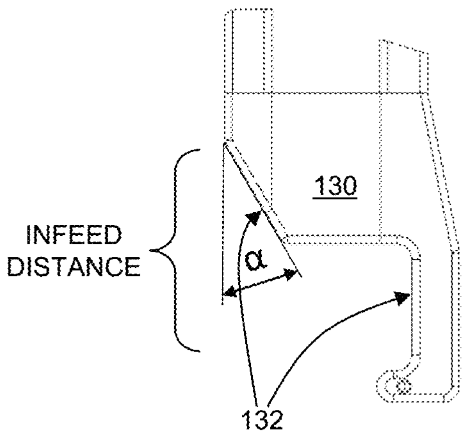
FIG. 3C is a detail view showing a transition member and a portion of a drive bar and support bar.
Figure 7A:
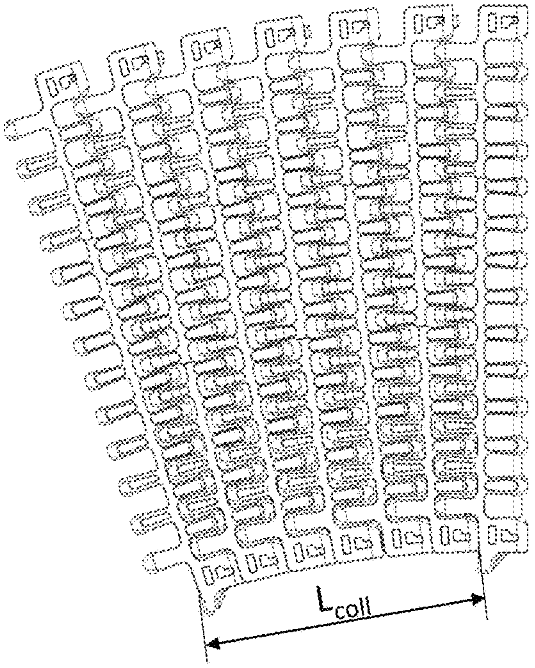
FIG. 7A is a top view of a portion of a conveyor according to the present disclosure shown with an inner portion collapsed.
Figure 7B:
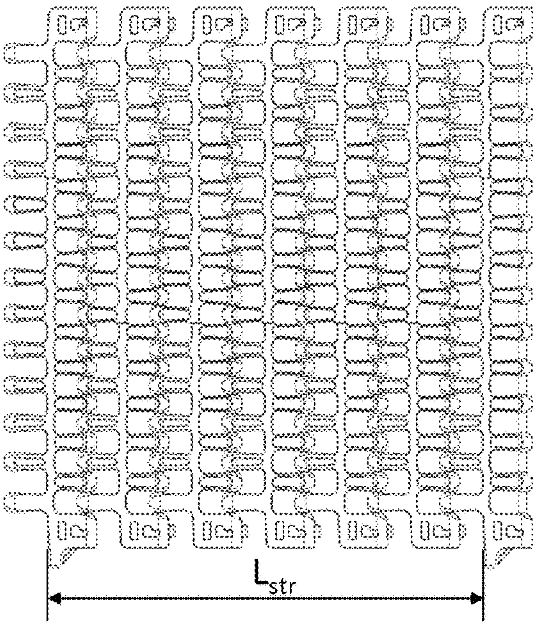
FIG. 7B is a top view of the conveyor portion of FIG. 7A, wherein the conveyor is not collapsed.
Figure 8:
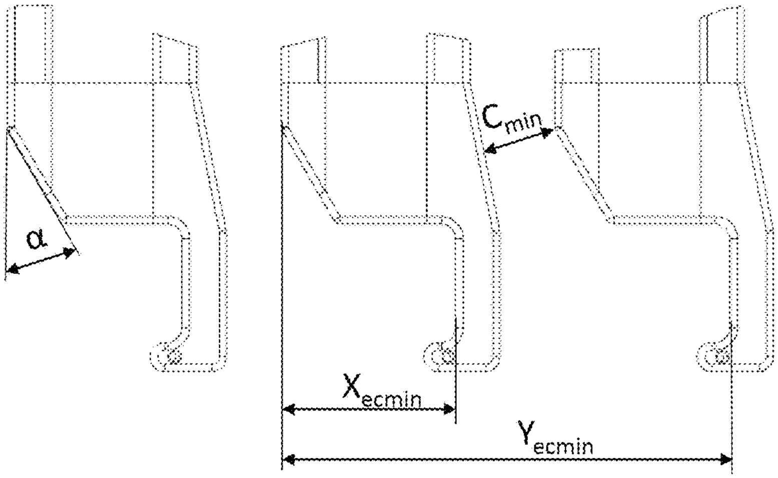
FIG. 8 is a side elevation view of a set of transition members.

The drum 110 has a plurality of transition members 130. Each transition member 130 of the plurality of transition members includes a drive surface 132. Each transition member 130 is disposed on the circumference of the drum 110. At least a portion of the drive surface 132 of each transition member 130 is disposed at an angle α to the axis of rotation (see, e.g., FIG. 3C). The angle is measured with respect to a vertical axis in a tangential plane of the drum. At least a portion of the drive surface 132 of each transition member 130 is configured to engage with a tooth of the modular belt and may cause a section of the belt proximate to the transition member to advance at a rate faster than a rotational speed of the drum—thereby urging the local modules of the belt to collapse. The angle α of at least a portion of each drive surface 132 is configured and the circumferential location of the drive surface is advanced by a "collapsing distance" of the corresponding modular belt over an infeed distance (a vertical distance from an entry height of the conveyor belt to the transition height). For example, in some embodiments, α is between 1° and 45°. With reference to FIGS. 7A and 7B, the collapsing distance is the difference in distance between adjacent teeth of the modular belt in an expanded (stretched) state, $L_{str}$, and the distance between adjacent teeth in a collapsed state, $L_{coll}$. In this way, each transition member may collapse the belt (the local section of the belt) over at least a portion of the infeed distance.

FIGS. 6A-6C show a behavior of belt over the infeed distance of a drum of an exemplary embodiment of the present disclosure. In FIG. 6A, the belt can be seen at or near an entry height (where the belt enters the spiral system). It can be seen that the belt is not collapsed (e.g., there is a distance remaining between at least some of the belt modules) and the teeth 292 of certain belt modules are located generally in advance of the drive surface 232 of the transition members 230. In this stage, the belt will continue to collapse on its own as it begins to follow the curvature of the drum. FIG. 6B shows the belt generally fully collapsed, but having small irregularities or other inconsistencies in its configuration (e.g., portions along the belt width which may not have collapsed evenly with others causing modules to be at inconsistent angles with other modules, etc.) In this stage, the teeth of the local belt modules begin to engage the drive surfaces of the corresponding transition members, for example, at the portion of the drive surface which is at an angle α with respect to the axis of rotation of the drum. FIG. 6C shows the belt at the transition height ($H_t$), where the teeth move from the drive surfaces of the transition members 230 to the drive sides 222 of the drive bars 220. In the embodiment shown, a portion of each drive bar (i.e., beginning at the transition height) is integral with a corresponding transition member. At this stage, the belt is fully collapsed and in a generally regular, curved pattern around the circumference of the drum. As such, the belt can provide a more smooth and predictable motion over the remainder of the drum height.

In some embodiments, minimum values for the configuration of the transition members may be determined mathematically. For example, with reference to FIGS. 7A-9B, given $L_{coll}$ as the distance between adjacent teeth of a belt in the collapsed state, $L_{str}$ as the distance between adjacent teeth of the belt in the stretched state, $W_{tooth}$ as the width of each tooth, $F_{safe}$ as the safety factor for the entrance cam, and $T_{safe}$ as the safety factor for the tooth clearance, then:

$$X_{ecmin} = L_{str} - L_{coll} + F_{safe}; \tag{1}$$

$$C_{min} = W_{tooth} + T_{safe}; \text{ and} \tag{2}$$

$$Y_{ecmin} = L_{str} + E_{safe}; \tag{3}$$

where $X_{ecmin}$ is the minimum distance of the entrance cam, $C_{min}$ is the minimum distance for tooth between two entrance cams, and $Y_{ecmin}$ is the minimum distance between entrance cams on bottom side.

Figure 11:
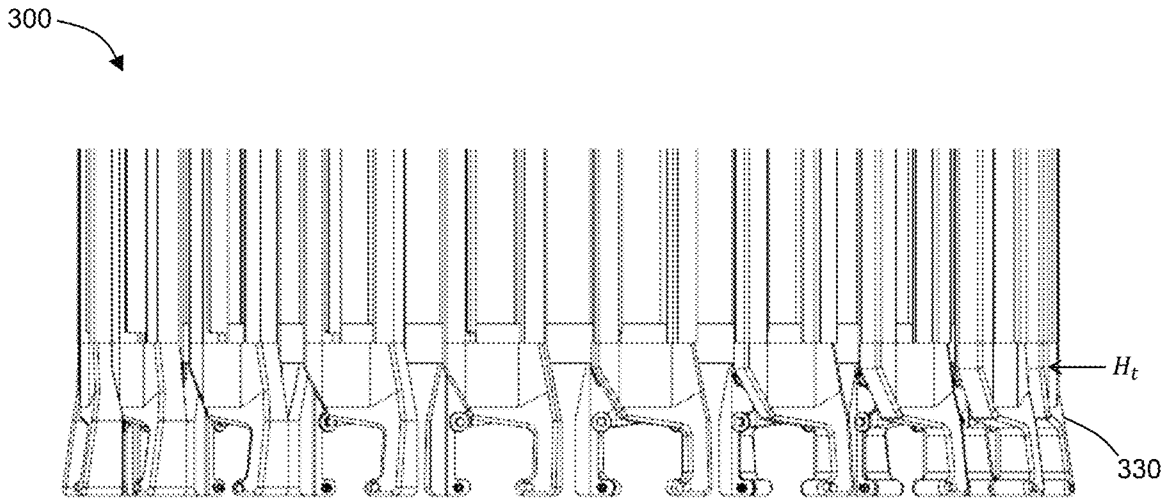
FIG. 11 is a side elevation view of a portion of a drum according to another embodiment of the present disclosure.
Figure 12:
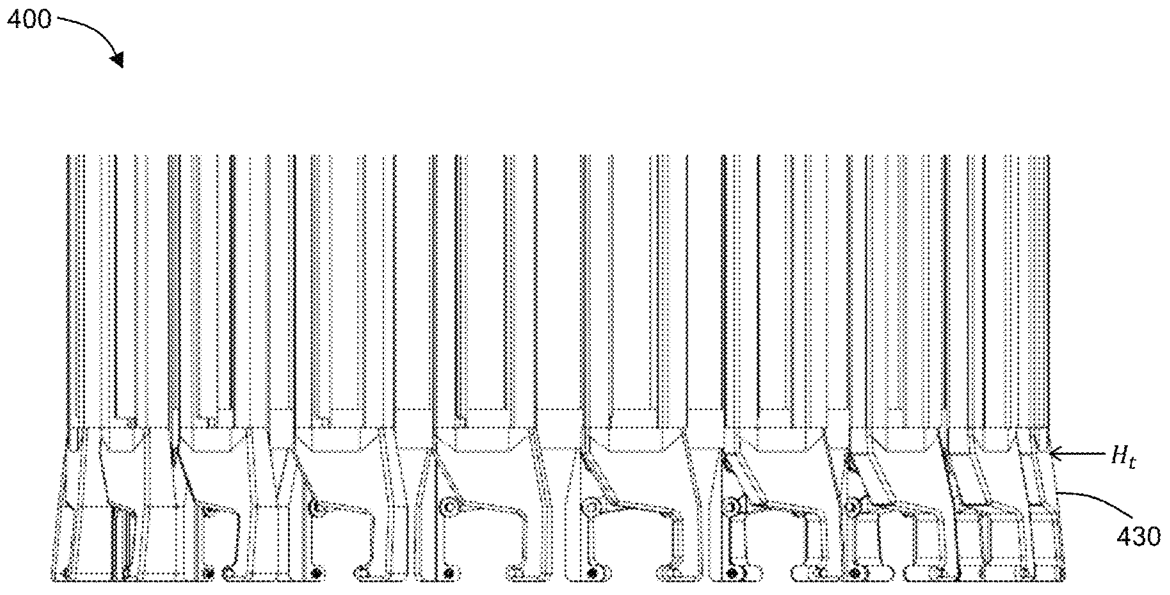
FIG. 12 is a side elevation view of a portion of a drum according to another embodiment of the present disclosure.
Figure 13:
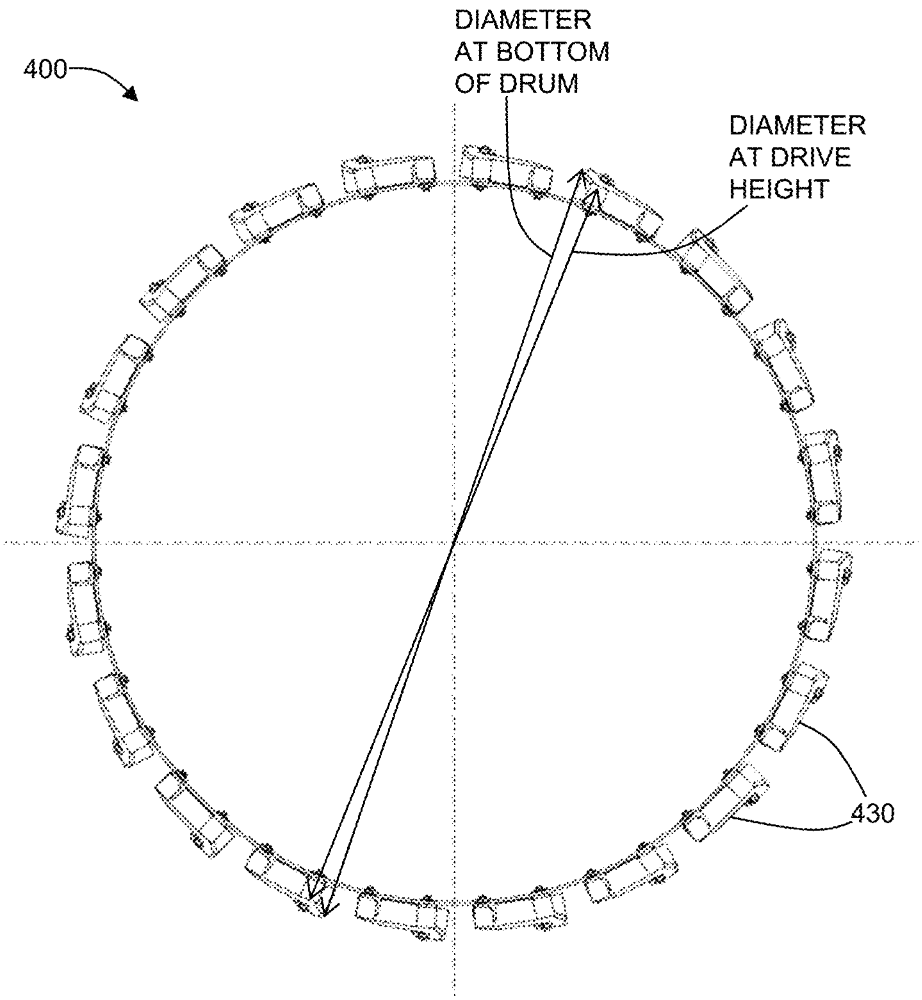
FIG. 13 is a top view of the drum of FIG. 12.

Over the infeed distance, the conveyor belt may move radially inward while the modules collapse (i.e., the distance between teeth decreases). In some embodiments, the transition members and/or the drive bars may be tapered over at least a portion of the respective heights—e.g., may have an angle radially with respect to the vertical axis such that the diameter of the drum varies over the height. FIG. 11 shows a partial view of embodiment of a drum 300 where a portion of the transition members 330 are tapered at an angle such that the diameter of the drum is wider at the bottom of the drum than it is at the transition height. In the embodiment of a drum 400 partially depicted in FIGS. 12 and 13, the transition members 430, or portions of the transition members, are tapered such that the drum is wider at the bottom until just above normal position of the transition height. In other embodiments, the transition members and the drive bars are not tapered over the respective heights.

The transition members 130 and the drive bars 120 are configured such that at the transition height, the circumferential location of each drive surface 132 of the plurality of transition members 130 is aligned with a circumferential location of a corresponding drive side 122 of a drive bar 120. In this way, once the conveyor belt is fully engaged by the drum, the teeth are transitioned to be driven by the drive bars. It should be noted that an interface 136 between a drive surface 132 and the corresponding drive side 122 may be smoothed by chamfering or radiusing the interface or similar easing at the interface. Embodiments having such a smoothed interface should be considered as part of the scope of the disclosure. For example, a transition member which has a chamfered interface with the corresponding drive bar is still to be considered as having an angle over at least a portion of the infeed distance (even though a portion of the transition member over the infeed distance is chamfered).

It should be noted that a drive bar and its corresponding transition member may make up an integral component—e.g., made from a single piece, joined to become a single piece (e.g., by welding, brazing, etc.), or otherwise. In some embodiments, a drive bar and its corresponding transition member may be made from separate components which interface at the transition height. In some embodiments, a drive bar and its corresponding transition member may be made from two or more separate components which interface at location(s) other than the transition height.

Figure 4:
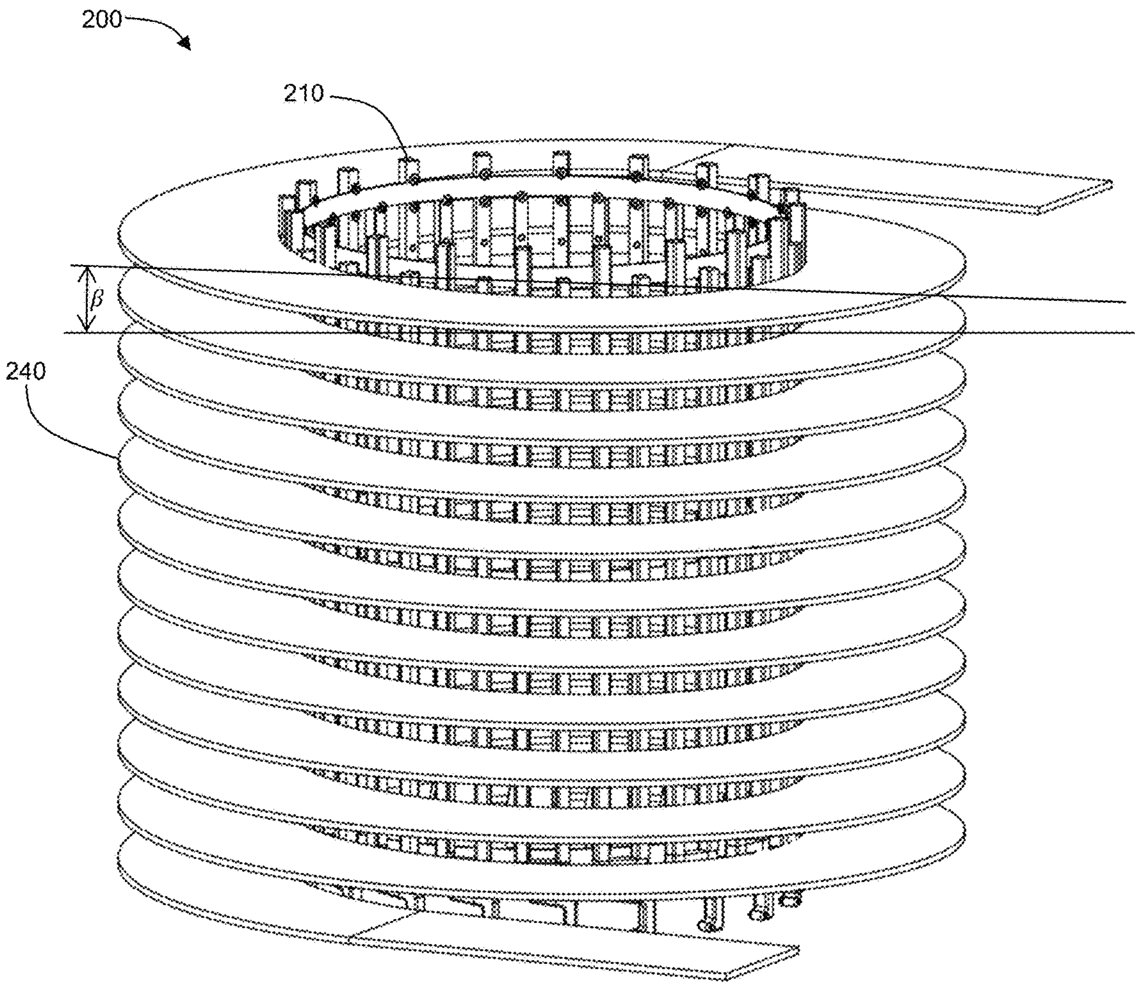
FIG. 4 is the drum of FIG. 3A, shown with a conveyor.
Figure 5:
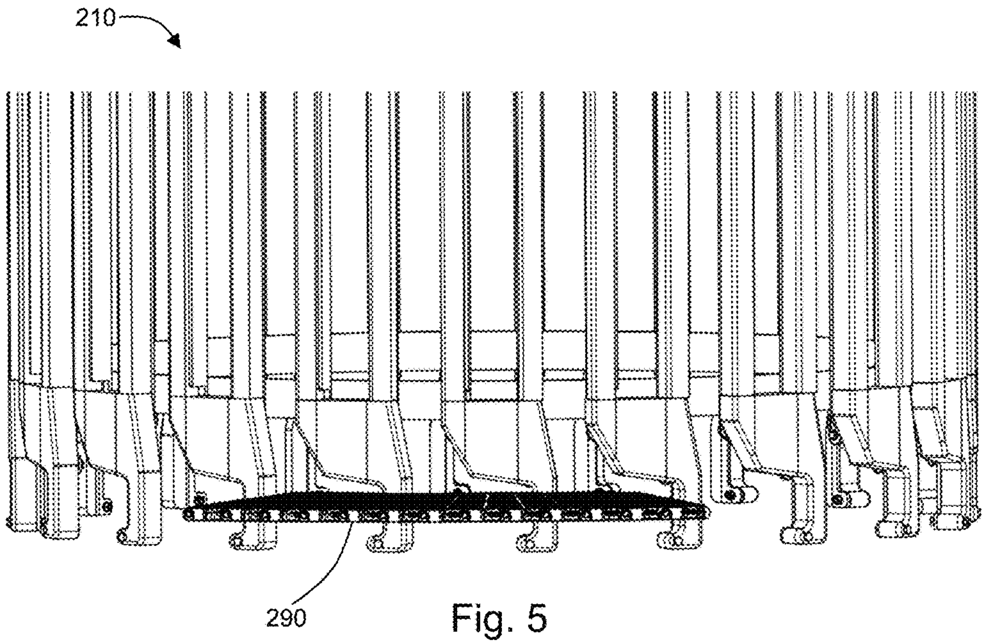
FIG. 5 is a detail view showing a portion of a conveyor at an infeed section of the drum.

Some embodiments of a spiral conveyor 200 include a helical support 240 around the circumference of the drum (see, e.g., FIG. 4). The helical support 240 is configured to support a conveyor belt as it traverses the drum 220. The helical support 240 has a helix angle, which is configured such that the belt travels a particular circumferential distance over a given height. A spiral conveyor may be configured such that a conveyor belt will travel between ¼ and 2 full rotations around the drum (i.e., 90°-720°) over the infeed distance. In some embodiments, the conveyor may be configured such that the corresponding belt travels over 200°, 210°, 220°, 230°, 240°, 250°, 260°, 270°, 280°, 290°, 300°, 330°, 360°, 390°, 420°, 450°, 480°, 510°, 540°, 570°, 600°, 630°, 660°, or 690° of the drum's circumference over the infeed distance. In some embodiments, the conveyor is configured such that the belt travels over between 260° and 270° of the drum's circumference over the infeed distance.

The spiral conveyor 100 may further include a plurality of support bars 140. The support bars 140 may be arranged in parallel around the circumference of the drum 110. The support bars 140 may be spaced apart and disposed between the drive bars 120. For example, each support bar may be disposed between two drive bars such that the drive bars and support bars alternate around the circumference of the drum. In other embodiments, the ratio of support bars to drive bars may not be 1:1. For example, two (or more) support bars may be disposed between adjacent drive bars. Each support bar 140 has a length which extends from at least the transition height upwards (in an upgoing conveyor) or downwards (in a downgoing conveyor). In some embodiments, each support bar extends from a corresponding transition member upwards or downwards (as applicable).

Each support bar 140 forms part of the circumferential surface structure of the drum and has a belt support surface 142 which is directed outwardly, in a radial direction away from the drum rotation axis, and thereby contacts and supports the edge of the modular conveyor belt. The belt support surface may form part of the outermost surface of the drum. The support bars can have different cross-sectional shapes, e.g., a rectangular shape or a rod shape. The length of a support bar (along its longest or longitudinal axis) is several times larger than its width or diameter, e.g., its ratio of length:width or length:diameter is from 5:1 to 100:1. In some embodiments, the ratio is between 10:1 to 100:1. In some embodiments, the ratio is between 10:1 and 25:1. The width or diameter of a support bar may range from 30 mm to 150 mm, but may be smaller or larger than these widths. The length of a support bar can be up to 8 m or more, depending on the height of the drum. A support bar may have one or more edges not serving as part of the belt support surface—e.g., chamfered edges, radiused edges, etc. The shape of the support bars may be the same as or different from the shape of the drive bars.

Figure 10A:
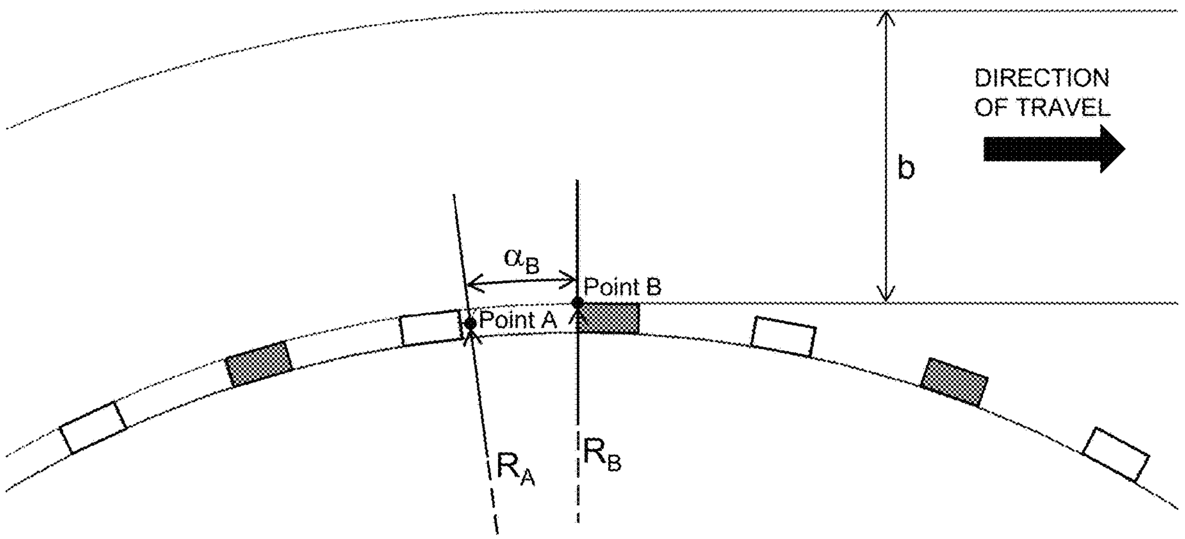
FIG. 10A is a top view schematic of a drum portion and belt at the outfeed of a conveyor belt.
Figure 10B:
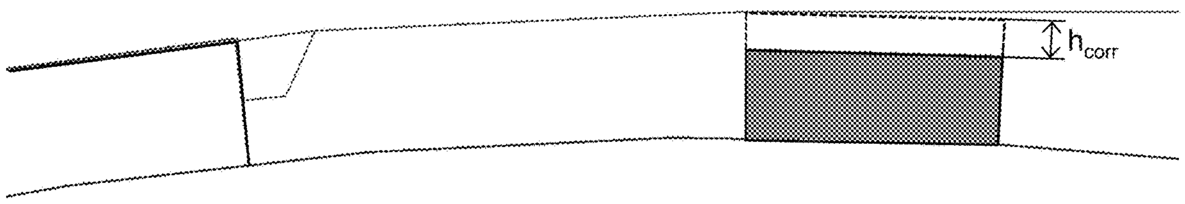
FIG. 10B is another top view schematic of a drum portion at the outfeed.

In some embodiments, the support bars 140 extend to an outfeed height, $H_o$, of the drum 110. The outfeed height is the height at which the conveyor belt begins to separate from the drum. In other words, the outfeed height is the height at which the belt moves from full engagement to partial engagement of the drum. For example, the outfeed height may be lower than the top of the drum (e.g., top of the drive bars) in an upgoing spiral, and higher than the bottom of the drum (e.g., bottom of the drive bars) in a downgoing spiral. In some embodiments, the outfeed height is lower than the top of the drum in an upgoing conveyor (higher than the bottom of the drum in a downgoing conveyor). In this way, the support bars do not extend as far as the drive bars extend. By the support bars ending at the outfeed height, the teeth of the conveyor belt are able to pass over the ends of the support bars in an upgoing conveyor (or under in a downgoing conveyor), see, e.g., FIGS. 10A-10B. Over the distance between the transition height and the outfeed height, an inside end of the modular belt may be supported by the drive bars and the support bars. In some embodiments, a trailing edge of each support bar is notched so as to allow a tooth of the modular belt to pass without interference from the support bar. Interference of the support bars may be determined according to:

$$h_{corr} = R_A - \frac{R_B}{\cos\left(\frac{(R_A + b)\cdot\alpha_B}{R_A + b - R_B}\right)}, \tag{1}$$

$$\text{where } \begin{cases} h_{corr} \le 0 \text{ indicates no interference} \\ h_{corr} > 0 \text{ indicates correction needed} \end{cases}$$

where $R_A$ is the radius at an inner-most extent of a belt tooth (labelled point A in the figure), $R_B$ is a radius at an outer-most trailing edge of a support bar (labelled point B in the figure), $\alpha_B$ is an angle between point A and point B, and b is a width of the belt. When correction is indicated (e.g., when $h_{corr}$ is positive), the value of $h_{corr}$ indicates the height of the correction. In other words, $h_{corr}$ indicates the amount by which the support bars should be shorter than the drive bars.

The materials of the drive bars, support bars, transition members, and/or conveyor belt may be the same or different from material(s) of the other components. Suitable materials may be metals (e.g., steel, aluminum, etc.), polymers (e.g., polyethylene, ultra-high molecular weight (UHMW) polyethylene, polypropylene, polyoxymethylene (POM), polyamide (PA), polytetrafluoroethylene (PTFE), polyethylene terephthalate (PET, polyester), polyurethane, etc.), composites, or other materials. Some suitable materials may be modified to enhance properties which may be beneficial in certain applications. For example, some materials may be infused with wax and/or other lubricants, coated with low-friction coatings, or otherwise modified to lower friction losses. This may be beneficial for example, in a downgoing spiral configuration to better allow a conveyor belt to follow the downward helical path using gravity to move downward. In some embodiments, the materials of some or all components are selected to be different in order to exploit the capabilities of each. For example, a support bar may be made from a low-friction material (e.g., polyethylene having self-lubricating additives) such that its supported conveyor belt may more easily move upwards (or downwards as the case may be). In another example, a drive bar may be made from steel to enhance durability. In another example, a drive bar may be made from a polymer and having a drive side made from steel. In another example, an infeed portion (e.g., transition members and/or portions of drive bars, etc.) of a spiral conveyor may be made from a durable material while the remainder of the belt-engaging components (e.g., drive bars, support bars, etc.) may be made from low-friction materials. In yet another example, a drive bar may have a core made from a first material (e.g., steel) with a cap made from another material or materials (e.g., UHMW polyethylene). Other combinations of materials may be used for the drive bars, support bars, transition members, belt modules, or any other component of a drum and/or conveyor belt.

As mentioned above, in some cases, an existing drum may be retrofitted to function as described herein. For example, in a drum used in an existing friction drive system, the drum may have closed sheets of material (e.g., metal) covering an outer periphery. To retrofit such a drum, drive bars and other components (e.g., transition members, support bars, etc.) according to the present disclosure may be affixed to the closed sheets of metal. For example, drive bars may be bolted, welded, or otherwise joined to the surface of the metal drum. In other cases, the closed sheets of material may be removed or partially removed to allow the addition of components of the present drum disclosure.

In this disclosure, the terms “conveyor belt,” “modular belt,” and “modular conveyor belt” are terms generally used interchangeably to describe a conveyor belt made up of a plurality of interconnected belt modules. Although the present disclosure has been described with respect to one or more particular embodiments, it will be understood that other embodiments of the present disclosure may be made without departing from the spirit and scope of the present disclosure.

What is claimed is:

1. A spiral conveyor comprising:

a rotating cylindrical drum extending from a bottom to a top, and having a transition height where a modular belt is fully engaged by the drum, the drum comprising:

a plurality of drive bars, each drive bar having a drive side parallel to an axis of rotation of the drum and extending in length from the transition height to the top of the drum for an upgoing conveyor, or from the transition height to the bottom of the drum for a downgoing conveyor, and wherein the drive bars are spaced apart around a circumference of the drum;

a plurality of transition members, each transition member having a drive surface, wherein at least a portion of the drive surface of each transition member is at an angle to the axis of rotation of the drum such that over an infeed distance, the circumferential location of the drive surface of each transition member is advanced by at least a collapsing distance of a corresponding modular belt having a plurality of teeth spaced apart along a length of the modular belt on an inside edge, wherein the collapsing distance is the difference between the distance between adjacent teeth of the modular belt in a stretched state and the distance between adjacent teeth of the modular belt in a fully collapsed state;

wherein at the transition height of the drum, the circumferential location of each drive surface is aligned with a circumferential location of a drive side of a corresponding drive bar; and a helical support around a circumference of the drum, wherein a helix angle of the helical support is such that the helical support extends ¼ to 2 times the circumference of the drum over the infeed distance.

2. The spiral conveyor of claim 1, further comprising a plurality of parallel support bars, wherein at least one support bar is disposed between each adjacent pair of drive bars around the circumference of the drum, and wherein each support bar extends upwards from at least the transition height in an upgoing conveyor and downwards from at least the transition height in a downgoing conveyor.

3. The spiral conveyor of claim 2, wherein each support bar extends from the corresponding transition member to an outfeed height of the drum.

4. The spiral conveyor of claim 1, further comprising a modular belt driven on a helical path around the drum by the plurality of drive bars engaging with a plurality of teeth on an inside edge of the modular belt.

5. The spiral conveyor of claim 4, wherein the modular belt comprises a plurality of belt modules, and wherein each tooth of the plurality of teeth is spaced apart by two or more belt modules.

6. The spiral conveyor of claim 5, wherein at least one belt module of the two or more belt modules has a pitch different from a pitch of at least one other belt module of the two or more belt modules.

7. The spiral conveyor of claim 4, wherein each tooth of the plurality of teeth has a drive face configured to contact a drive side of a drive bar.

8. The spiral conveyor of claim 4, wherein over the infeed distance, the modular belt moves radially inward on the drum and the distance between adjacent teeth decreases.

9. The spiral conveyor of claim 8, wherein at the transition height, the modular belt is fully collapsed.

10. The spiral conveyor of claim 8, wherein between the transition height and the outfeed height, an inside edge of the modular belt is in contact with the drive bars and the support bars.

11. A spiral conveyor comprising:

a drum having an outer periphery extending from a bottom to a top with a transition height proximate the bottom for an upgoing spiral or proximate the top for a downgoing spiral, the drum comprising:

a plurality of parallel drive bars, each drive bar having a drive side extending in length on the periphery of the drum between the transition height and the top of the drum for an upgoing spiral and between the transition height and the bottom of the drum for a downward spiral;

a plurality of transition members, each transition member having a drive surface having a length on the periphery of the drum, wherein each drive surface is circumferentially aligned with a corresponding drive side of a drive bar at the transition height, and wherein at least a portion of each drive surface is at an angle to a rotational axis of the drum such that over an infeed distance, the circumferential location of the drive surface is advanced by at least a collapsing distance of a modular belt, wherein the collapsing distance is the difference between the distance between adjacent teeth of the modular belt in a stretched state and the distance between adjacent teeth of the modular belt in a fully collapsed state; and a modular belt configured to advance up or down in a conveying direction along a helical conveying path around the periphery of the drum, the modular belt having a plurality of teeth spaced apart along a length of the modular belt on an inside edge, each tooth of the plurality of teeth configured to engage a transition member and a drive bar of the drum.

12. The spiral conveyor of claim 11, further comprising a helical support around the periphery of the drum, wherein a helix angle of the helical support is such that the helical support extends ¼ to 2 times the circumference of the drum over the infeed distance.

13. The spiral conveyor of claim 11, further comprising a plurality of parallel support bars, wherein at least one support bar is disposed between each adjacent pair of drive bars around the circumference of the drum, and wherein each support bar extends upwards from at least the transition height in an upgoing conveyor and downwards from at least the transition height in a downgoing conveyor.

14. The spiral conveyor of claim 13, wherein each support bar extends from the corresponding transition member to an outfeed height of the drum.

15. The spiral conveyor of claim 11, wherein each tooth of the plurality of teeth has a drive face configured to contact a drive bar.

16. The spiral conveyor of claim 15, wherein each drive face is at an angle of between 1° and 5°, inclusive, with respect to a corresponding drive side of the drive bars.

17. The spiral conveyor of claim 11, wherein over the infeed distance, the modular belt moves radially inward on the drum and the distance between adjacent teeth decreases.

18. The spiral conveyor of claim 17, wherein at the transition height, the modular belt is fully collapsed.

19. The spiral conveyor of claim 17, wherein between the transition height and the outfeed height, an inside edge of the modular belt is in contact with the drive bars and the support bars.

20. The spiral conveyor of claim 11, wherein the modular belt comprises a plurality of belt modules, and wherein each tooth of the plurality of teeth is spaced apart by two or more belt modules.

21. The spiral conveyor of claim 20, wherein at least one belt module of the two or more belt modules has a pitch different from a pitch of at least one other belt module of the two or more belt modules.

* * * * *